United States Patent Office 2,975,509
Patented Mar. 21, 1961

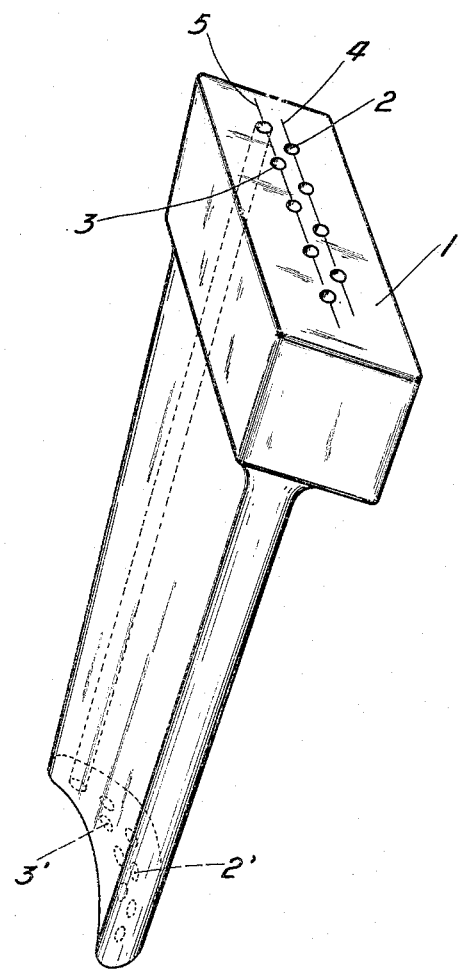

2,975,509

METHODS OF EXTRUDING METALS

Jacques Sejournet, Paris, France, assignor to Compagnie du Filage des Metaux et des Joints Curty Filed May 1, 1957, Ser. No. 656,344

Claims priority, application France May 7, 1956

1 Claim. (Cl. 29—156.8)

The present invention relates to a method of manufacture of hollow blades, especially for turbo-jet units.

Steam and gas turbines, in particular those of jet aircraft, are essentially composed of fixed blades forming stators, and moving blades forming rotors, these latter blades being mounted by their feet on wheels which rotate in the space between the blades of the stators. It is well known that these turbines have an efficiency which increases as the temperature of the fluid which passes through them increases. Now, since it is impossible to exceed the limit of resistance of the metals or alloys of which the fixed and moving blades are made, the temperature of the fluid with which these blades are in contact is in fact limited and thereby limits the efficiency of the machines.

Improvements made in the mechanical and physical properties at high temperature of the metals or alloys employed for the manufacture of blades have permitted, during the course of the last few years, a certain increase in the intake temperature of the gases or vapours, but further progress in this direction is becoming more and more difficult. In order to take the maximum advantage of these improvements, it has been proposed to cool the blades by an internal circulation of a fluid in order to evacuate part of the heat to the exterior; it has thus been necessary to construct blades with internal channels in which the cooling fluid can be circulated.

The industrial manufacture of hollow fixed blades is usually effected at the present time, for example in accordance with Sejournet U.S. patent application No. 419,553, filed March 29, 1954 belonging to the applicant company, which describes a method of manufacture of blades of this kind with a single cooling channel.

On the other hand, the applicant has described in Sejournet U.S. patent application Ser. No. 375,706, filed August 21, 1953, a further method of extrusion of composite products with internal cores which can be eliminated after extrusion, in order to obtain fixed blades with multiple holes or channels ensuring an excellent cooling.

Finally, the fixed blades may also be manufactured by precision casting.

The situation is very different in the case of hollow moving blades, since their manufacture with a number of cooling channels is much more difficult; in fact, the fixing foot with which these blades are provided, as has been stated above, gives them an irregular shape which the channels passing through the blade must however follow everywhere very closely. Now, in order to utilise to the best advantage the cooling air available for a total given surface, it is essential to provide the moving blades with a number of channels.

In order to satisfy these conditions, a certain number of means have already been proposed, all of which are more or less costly and complicated.

Thus, a number of elements have been fixed to each other by welding, but this kind of work is very difficult and the blades thus constructed do not have an adequate mechanical strength, especially along the welds.

Precision casting has also been used but this is a very expensive and awkward operation, especially when it is desired to form a large number of holes of small diameter, which are the most advantageous in practice.

Forging has also been employed, but this does not enable a number of internal channels to be obtained, in spite of a very high production cost due to the large number of operations necessary.

Finally, there has recently been described a method enabling blades to be obtained, traversed over their entire length by multiple channels which follow their contour. In accordance with this method, a round billet of a refractory alloy is pierced with a certain number of holes having a predetermined diameter and position. These holes are filled with a suitable material and this composite billet is transformed by extrusion into a bar, the cross section of which has the form of the foot of the blade to be obtained, that is to say, in general rectangular. The semi-product thus obtained is cut-up into elements of suitable length, each of which is again heated and extruded successively through a further extrusion die, which has the form of the blade. This second extrusion is stopped in order to leave a small portion unextruded, from which the fixing foot is then machined. The holes, which are still full of the original filling material, are then cleared and there is obtained as a finished product a hollow blade which conforms in principle with the characteristics given above.

Unfortunately, it has been found during use that in the actual state of the materials available, this method of manufacture was not suitable for large-scale production. In fact:

(a) In order that the holes may have the desired shape in the finished product, they should have a circular shape in the semi-product. Now, if a round billet pierced with round holes is extruded to the form of a bar with a rectangular cross section, or in the form of a parallelogram, the holes obtained in the semi-product are oval and do not permit the final desired shape of holes to be obtained in the blade;

(b) The holes are in general distributed in the foot or root with an arrangement similar to that which they have in the blade, that is to say in a cross section of any part of the blade, including the foot, their centres are aligned on an arc of a circle. The fixing of the moving blades on the wheel must therefore be effected by means of a dove-tail in a curved arc, which involves a very costly machining operation;

(c) The material with which the holes are filled must have characteristics which enable it to be deformed in the same manner as the alloy (generally refractory) in which it has been placed, and on the other hand, it must be a simple matter to remove it at the end of the operation. Now, no material which combines these properties has been proposed up to the present time.

The applicant has sought to overcome these drawbacks and these difficulties arising in previously-known methods. He has succeeded by the method in accordance with the present invention which relates to a method of manufacture of hollow moving blades for steam or gas turbines, and especially for turboreactors, in which two extrusion operations are carried out in succession, with lubrication, starting from a billet of steel or refractory alloy having a rectangular cross section and pierced with round holes, the number of which corresponds to that of the desired holes in the blade and filled with cylindrical rods of ordinary steel which are eliminated at the end of the second extrusion operation, the said method consisting essentially in aligning the centres of the round holes on one or a number of straight lines located substantially along one center line of the cross section of the billet, in extruding the billet in a rectangular container through a die having the same cross section as the foot or root of the finished blade, so as to obtain an extruded product which is then cut-up into elements of a length such that each corresponds to the volume of metal in a finished blade, and in extruding each element, if necessary after re-heating, in a container having the same cross section as the cross section of the foot of the said blade and through a die having the same cross section as the cross section of the blade, whilst leaving a butt sufficient to form the foot of the blade.

Before they are placed in the holes, the surfaces of the cylindrical rods may be oxidised in order to prevent them from adhering during the subsequent extrusion operations, thus facilitating their removal.

The cylindrical rods may also be coated with a covering material having the following composition:

Commercial silicate of soda: from 5 to 20 cu. cm., and preferably 10 cu. cm.,

Alumina: from 10 to 50 cu. cm., and preferably 25 cu. cm.,

Water: a sufficient quantity to make the mixture easy to spread.

In this composition, the alumina may be replaced by an equivalent quantity of chromium oxide.

In the case of blades intended especially for turboreactors, the billet is of a refractory steel; there is then an advantage in covering it in accordance with the method described in Buffet et al. application Ser. No. 646,192, filed March 15, 1957, with an envelope of sheet steel which is itself easy to extrude with the lubricant employed, for example of ordinary mild steel if the lubricant is window glass; in this case, it is advisable to complete this casing at the front by a thicker disc of the same mild steel.

In order to remove the rods, a pickling treatment is given, for example, at 70° C. in a solution of nitric acid, taking the precaution of ensuring a circulation of acid in the holes by means of tubes of stainless steel of very small diameter (hypodermic needles), or by wires or folded sheets of metal introduced into the holes, in order to facilitate thereby at the same time the evolution of the gas produced.

In the method in accordance with the invention, since the cross sectional shape of the billet is substantially similar geometrically to the cross sectional shape of the semi-product to be obtained during the course of the first extrusion operation, the initial round holes will remain substantially round in the semi-product. During the second extrusion operation, the round holes of the semi-product are transformed to oval holes in the blade portion only of the turbine blade and are arranged in such manner that in each cross section of the final blade portion thus obtained, their external envelope curve follows the exterior contour of the blade portion. In addition, the major axes of the cross sections of the oval holes have the same direction as the major axis of the blade portion in its nearest adjacent part.

Finally, it is essential to provide a correct lubrication of the extrusion by means of lubricants known in the art and, for example, by means of suitable vitreous lubricants; in fact, the lubrication ensures the uniform flow of the metal so that the successive cross sections of the semi-product for example give rise to successive sections in the blade; it is thus possible initially to arrange the holes in such a manner that their centres are aligned along one or a number of straight lines in a cross section of the billet, and the holes which are round in a cross section of the foot become oval in a cross section of the blade.

The whole of the above measures enables the foot of the blade to be fixed in the wheel by means of a straight dovetail and, on the other hand, the lubrication ensures the reproducibility of the phenomenon under the best conditions, which means that the method of the present invention enables industrial manufacture to be carried out easily on a large scale.

The accompanying drawing shows a perspective view of a moving blade obtained in conformity with the present invention. There can be seen the foot 1 of the blade, of rectangular cross section, in which two series of round holes, 2, 3 are aligned along two straight lines 4 and 5 respectively located substantially along the center line of the cross section of the billet. After extrusion, the holes 2', 3' are oval in the cross sections of the extruded blade portion of the turbine blade. For the sake of clearness, the correspondence between circular holes and oval holes has been shown in dotted lines only for one single hole.

In accordance with the invention, the open die can be replaced by a closed frusto-conical die, thus giving directly a frusto-conical shape to the blade by extrusion, that is to say a shape the section of which becomes smaller as the distance from the foot increases. In this case, the holes become smaller in section while remaining substantially oval and arranged as has been indicated above. The said closed die referred to can be produced by two or more members assembled along generator lines, which enables a corkscrew shape to be given directly to the blade.

Finally, in all cases, a hollow form can be given with advantage to the front of the ram employed for the second extrusion operation, which enables a foot of trapezoidal shape to be obtained directly.

Starting from two rows of holes aligned along two straight lines in a cross section of the foot portion, the method in accordance with the invention enables the cooling to be increased, since it gives in the blade portion, holes arranged in two alignments in a cross section of the blade portion, and on the other hand, the oval section of the said hole in the blade portion is greater for a given perimeter than that of the holes of circular section in the foot portion, which still further assists the cooling. This increase in the cooling surface in the blade portion constitutes a very important advantage, since the air used in cooling is thus applied in holes having a maximum surface, which enables it to be used with the greatest effectiveness, the quantity of air necessary for a given cooling effect being thereby reduced.

It is quite clear that the method described above, and which is especially suitable for the manufacture of hollow moving blades of turbo-reactors, can be used in an identical manner for the manufacture of hollow blades for all other applications and for all kinds of fluid, for example for gas or steam turbines for use on the ground.

What I claim is:

A method of making turbine blades having a foot portion which is rectangular in cross section and a blade portion having a curved cross section, said foot portion and said blade portion having cooling passages extending through them, which comprises forming in a billet of a refractory alloy having a rectangular cross section, a plurality of longitudinal passages extending substantially throughout the length of said billet, said longitudinal passages being circular in cross section and being aligned in at least one straight line located substantially along one center line of the cross section of the billet to allow subsequent dovetailing of the butt portion, filling said longitudinal passages with cylindrical rods of ordinary steel, heating said billet to extrusion temperature, coating said billet with a vitreous lubricant which remains viscous at the extrusion temperature, extruding said billet in the direction in which said longitudinal passages extend in a rectangular container through a die to produce a bar having the same cross section as that desired in the foot portion of the turbine blade, cutting the bar transversely into bar portions each suitable for forming a turbine blade, extruding said bar portions in the direction in which said longitudinal passages extend in a container having the same cross section as said bar portions through a die having the same cross section as the blade portion of said turbine blade but leaving in the container an unextruded butt portion which forms the foot portion of the turbine blade, and removing said rods of ordinary steel from said turbine blade to provide cooling passages extending therethrough.

References Cited in the file of this patent

UNITED STATES PATENTS

| | | |
|---|---|---|
| 1,430,399 | Parsons et al. | Sept. 26, 1922 |
| 1,751,758 | Ray | Mar. 25, 1930 |
| 1,963,946 | Van Osdol | June 19, 1934 |
| 2,013,622 | Bedford et al. | Sept. 3, 1935 |
| 2,047,555 | Gardner | July 14, 1936 |
| 2,123,416 | Graham | July 12, 1938 |
| 2,389,876 | Sequin | Nov. 27, 1945 |
| 2,538,917 | Sejournet et al. | Jan. 23, 1951 |
| 2,628,417 | Peyches | Feb. 17, 1953 |
| 2,756,494 | Sejournet | July 31, 1956 |
| 2,773,302 | Watson | Dec. 11, 1956 |
| 2,781,903 | Buffet et al. | Feb. 19, 1957 |
| 2,891,307 | Betteridge | June 23, 1959 |

FOREIGN PATENTS

| | | |
|---|---|---|
| 459,742 | Great Britain | Jan. 14, 1937 |
| 905,735 | France | Apr. 30, 1945 |
| 745,655 | Great Britain | Feb. 29, 1956 |
| 755,610 | Great Britain | Aug. 22, 1956 |